United States Patent Office 3,244,535
Patented Apr. 5, 1966

3,244,535
EDIBLE PASTEURIZED PROCESS CHEESE COMPOSITIONS CONTAINING SODIUM ALUMINUM PHOSPHATE
Robert M. Lauck and James W. Tucker, Park Forest, and Reginald E. Vanstrom, Crete, Ill., assignors to Stauffer Chemical Company, New York, N.Y., a corporation of Delaware
No Drawing. Filed Mar. 4, 1963, Ser. No. 262,307
11 Claims. (Cl. 99—117)

This application is a continuation-in-part of our copending application, Serial No. 208,571, filed July 9, 1962, now U.S. Patent 3,097,949.

This invention relates to edible pasteurized process cheese compositions comprising cheese and, as a melting salt, a sodium aluminum phosphate. Among the sodium aluminum phosphates which may be used are the known acidic crystalline and amorphous modifications as well as novel reaction products of the approximate empirical composition:

$$xNa_2O \cdot yAl_2O_3 \cdot 8P_2O_5 \cdot zH_2O$$

where $x$ is a number from 6 to 15, $y$ is a number from 1.5 to 4.5 and $z$ is a number from 4 to 40, and their water insoluble fractions.

The novel reaction products and water insoluble fractions of the present invention are initially prepared by reacting aluminum oxide, aluminum hydroxide (hydrated alumina) or sodium aluminate, and sodium hydroxide or sodium carbonate with concentrated phosphoric acid. This reaction is highly exothermic and proceeds to completion in a matter of minutes. The resulting reaction product is a mixture consisting of a water soluble fraction and a water insoluble fraction; the relative proportions being dependent upon at least several factors, including mainly, the aluminum content of the reaction mixture, the speed at which the reaction is accomplished, and the degree of agitation during reaction. Reaction products with higher aluminum content will normally have higher ratios of insolubles to solubles (up to about 2:1) while those with lower aluminum have proportionally lower ratios (down to about 1:2). The soluble fraction is composed of an intimate mixture of two or more sodium orthophosphates. From the hydrolysis characteristics of the insoluble fraction, it appears to be composed of two or more water insoluble sodium aluminum phosphates.

X-ray studies of the novel reaction products show the presence of one of two unique X-ray patterns, which will be hereafter referred to as Patterns A and B. Pattern A is found in the reaction products having high sodium content; that is, when $x$ in the above empirical composition is between 14 and 15. Pattern B is normally found where the sodium content is less than 14. Actually, at a low sodium content, i.e., between 6 and 9 gram atoms of sodium for each 8 gram atoms of phosphorus, only a faint pattern may be observed by qualitative X-ray examination, while at a sodium content between 9 and 14 gram atoms, the pattern is relatively intense and sharp. X-ray patterns for the insoluble fractions of the reaction products indicate the presence of the same unique patterns. When reaction products are prepared with high sodium content, i.e., 10–15 Na for each 8 P, X-ray lines for $Na_2HPO_4 \cdot 2H_2O$ are also usually observed to be present, superimposed on the pattern for the insoluble portion.

These $Na_2HPO_4 \cdot 2H_2O$ lines are, of course, absent in the insoluble fractions after leaching.

The leached insoluble portion of the reaction product will slowly hydrolyze in warm water over a period of at least several weeks to furnish soluble sodium orthophosphates. Although not fully established, the hydrolysis characteristics seem to indicate that the insoluble fraction of the reaction mixture is itself a novel composition comprising at least one hydrolyzable amorphous material and a crystalline material. Typical examples of the reaction products of the invention and the insoluble fractions which may be leached therefrom, are set forth in Table I, infra. Each reaction product was leached for a period of one hour in distilled water at room temperature and under constant agitation.

TABLE I.—REACTION PRODUCTS LEACHED IN WATER (R.T.) FOR ONE HOUR

| Test Sample | Reaction Products (soluble and insoluble fractions) | | Insoluble Fraction | |
|---|---|---|---|---|
| | Elemental Analysis Na:Al:P (Moles) | 25% Slurry pH | Percent by Weight of Total Reaction Product | Elemental Analysis Na:Al:P (Moles) |
| 1 | 15:1.5:8 | 8.8 | 47.3 | 10.0:3:7.4 |
| 2 | 15:2.0:8 | 9.1 | 43.0 | 9.3:3:6.1 |
| 3 | 15:2.5:8 | 9.2 | 47.9 | 7.8:3:5.4 |
| 4 | 15:3.5:8 | 9.8 | 54.8 | 7.3:3:4.5 |
| 5 | 15:4.0:8 | 9.9 | 62.0 | 7.0:3:4.2 |
| 6 | 15:4.5:8 | 9.9 | 63.9 | 6.4:3:3.7 |
| 7 | 13:1.5:8 | 6.9 | 35.5 | 8.2:3:6.5 |
| 8 | 13:2.0:8 | 7.5 | 40.5 | 7.7:3:5.7 |
| 9 | 13:2.5:8 | 7.7 | 45.3 | 7.0:3:5.2 |
| 10 | 13:3.5:8 | 8.5 | 53.5 | 6.5:3:4.3 |
| 11 | 13:4.0:8 | 8.5 | 57.0 | 5.4:3:3.8 |
| 12 | 13:4.5:8 | 8.9 | 60.4 | 4.7:3:3.4 |
| 13 | 11:1.5:8 | 6.0 | 37.1 | 6.9:3:5.7 |
| 14 | 11:2.0:8 | 6.1 | 48.8 | 7.2:3:5.7 |
| 15 | 11:2.5:8 | 6.5 | 53.3 | 6.7:3:5.6 |
| 16 | 11:3.5:8 | 7.3 | 55.5 | 4.8:3:4.1 |
| 17 | 11:4.0:8 | 7.3 | 58.5 | 4.1:3:3.7 |
| 18 | 15:3.0:8 | 9.5 | 51.1 | 7.7:3:4.8 |
| 19 | 13:3.0:8 | 8.3 | 43.9 | 5.1:3:4.2 |
| 20 | 11:3.0:8 | 7.0 | 43.0 | 3.6:3:3.8 |
| 21 | 11:4.5:8 | 7.1 | 54.4 | 2.8:3:3.0 |
| 22 | 9:2.0:8 | 6.1 | 38.6 | 4.2:3:5.0 |
| 23 | 9:2.5:8 | 6.2 | 42.6 | 4.2:3:4.8 |
| 24 | 9:3.5:8 | 6.3 | 57.2 | 3.7:3:4.1 |
| 25 | 9:4.0:8 | 6.5 | 60.1 | 3.6:3:3.8 |
| 26 | 7:1.5:8 | 4.8 | 29.3 | 2.5:3:4.7 |
| 27 | 7:2.0:8 | 5.1 | 36.8 | 2.7:3:4.4 |
| 28 | 7:2.5:8 | 5.6 | 44.6 | 3.1:3:4 8 |
| 29 | 7:3.5:8 | 5.7 | 59.6 | 3.1:3:4.5 |
| 30 | 7:4.0:8 | 5.8 | 59.7 | 2.4:3:3.3 |

The soluble fractions leached from the reaction products shown in Table I contained substantially no aluminum and were found to have phosphorus present as essentially all orthophosphate ion.

Although the exact structural formulas of the insoluble sodium aluminum phosphate fraction are not presently known, this fraction may be characterized by the following empirical composition:

$$aNa_2O \cdot 3Al_2O_3 \cdot bP_2O_5 \cdot cH_2O$$

wherein $a$ is a number between 2 and 11, $b$ is a number between 2.5 and 7.5, and $c$ is a number between 4 and 30.

Since the aluminum remains in the hydrolysis residue, it has been selected as the constant in the above empirical composition. As mentioned heretofore, during the hydrolysis of the insoluble fraction, water soluble sodium orthophosphates are formed. These water soluble sodium orthophosphates have been determined to be mixtures of mono-, di-, or trisodium orthophosphates, the mono- and disodium orthophosphates predominating in solutions where the insoluble fraction has a low sodium content, while the trisodium phosphate is normally found where the sodium content is high. Accordingly, the soluble hydrolysis product formed from an insoluble fraction containing a mole ration of Na:Al:P of about 5:3:6 will typically consist of about 80% monosodium orthophosphate and 20% disodium orthophosphate. On the other hand, when the insoluble fraction has a Na:Al:P mole ratio of about 8:3:6, the hydrolysis-formed sodium phosphate will be essentially a mixture of disodium orthophosphate and trisodium orthophosphate, the former slightly predominating.

Because of their slow "release" of sodium orthophosphates, the reaction products and/or the insoluble fractions thereof may be utilized to produce a "buffering effect" on the pH when incorporated in an aqueous system. This buffering effect may be controlled over a wide range since the sodium orthophosphates range between a pH value of 4.4 for monosodium orthophosphate and about 11.5 for trisodium orthophosphate. The hydrolysis characteristics of several insoluble fractions (at 100° C.) is compared in Table II. In the hydrolysis experiments, the hydrolysis liquor was discarded after analysis and the solids were re-slurried in a fresh portion of distilled water.

Comparing the data from the first and third hydrolyses, above, it may be observed that the low sodium sample produced hydrolysis solutions which steadily increased in pH, while the high sodium sample steadily decreased in pH. In each case, as hydrolysis proceeded, the solution pH appeared to approach that of a pure disodium phosphate solution. From the analysis of the hydrolysis solution of the third reaction product, the final solution after thirty-two days contained essentially all disodium phosphate (pH=9.2).

When hydrolyzing the insoluble fractions containing a high sodium content (about 8–11 Na:3Al), it has been observed that the X-ray pattern undergoes a gradual change from Pattern A to Pattern B. Although the reason for this change is not fully understood, it appears likely that the crystalline portion of the insoluble fraction undergoes cleavage at Na—O—Al= linkages to form H—O—Al= linkages. This possibility would also account for the formation of trisodium phosphate which, theoretically, would not be formed directly by hydrolysis of the insoluble fraction, but which could result upon hydrolysis of Na—O—Al= linkages in the presence of disodium orthophosphate.

Due to the complex nature of the reaction products and the insoluble fractions, X-ray powder patterns have been found to be especially useful for characterizing these new substances. Each pattern will readily show the existence of a unique and distinct crystalline species plus the presence of any disodium orthophosphate. The d-spacings of the lines of greatest intensity for the high sodium reaction products ($x$=14 to 15) and their soluble fractions, are at 8.4, 5.38, and 4.63 angstroms (A pattern),

TABLE II.—HYDROLYSIS OF INSOLUBLE FRACTIONS AT 100° C.

| | Analysis of Hydrolysis Solution (gram atoms) Na–Al–P | Approximate Na:Al:P ratio in Solids | Remarks |
|---|---|---|---|
| TEST SAMPLE 1 | | | |
| Reaction Product | | 8.0:3:8.0 | Low sodium sample. |
| Insoluble fraction | | 4.6:3:5.9 | Leached for 1 hr. at R.T. |
| Initial Slurry | 0-0-0 | | 580 gms. Insoluble Fraction in 2,000 ml. distilled H$_2$O. |
| Hydrolysis: | | | |
| After 2 days | 0.660-0.0006-0.585 | 3.5:3:4.6 | pH of hydrolysis soln. =5.9. |
| After 5 days | 0.680-0.0010-0.605 | 2.3:3:3.6 | pH of hydrolysis soln. =5.8. |
| After 9 days | 0.330-0.0007-0.288 | 2.0:3:3.3 | pH of hydrolysis soln. =6.1. |
| After 12 days | 0.050-0.0008-0.040 | 2.0:3:3.3 | pH of hydrolysis soln. =6.6. |
| After 19 days | 0.015-0.0007-0.010 | 2.0:3:3.2 | pH of hydrolysis soln. =7.0. |
| After 26 days | 0.010-0.0007-0.007 | 2.0:3:3.2 | pH of hydrolysis soln. =7.3. |
| TEST SAMPLE 2 | | | |
| Reaction Product | | 12.0:3:8.0 | Medium sodium sample. |
| Insoluble fraction | | 6.4:3:3.5 | Leached for 1 hr. at R.T. |
| Initial Slurry | 0-0-0 | | 480 gms. Insoluble Fraction in 2,000 ml. distilled H$_2$O. |
| Hydrolysis: | | | |
| After 4 days | 0.390-0.0016-0.276 | 5.6:3:5.2 | pH of hydrolysis soln. =6.7. |
| After 8 days | 0.270-0.0016-0.178 | 5.5:3:4.6 | pH of hydrolysis soln. =7.0. |
| After 11 days | 0.104-0.0013-0.065 | 5.2:3:4.5 | pH of hydrolysis soln. =7.2. |
| After 18 days | 0.132-0.0015-0.081 | 5.5:3:4.5 | pH of hydrolysis soln. =7.2. |
| After 25 days | 0.142-0.0013-0.085 | 5.5:3:4.4 | pH of hydrolysis soln. =7.2. |
| After 32 days | 0.162-0.0013-0.093 | 3.5:3:3.8 | pH of hydrolysis soln. =7.5. |
| TEST SAMPLE 3 | | | |
| Reaction Product | | 15.0:3:8.0 | High sodium sample. |
| Insoluble fraction | | 7.7:3:5.3 | Leached for 1 hr. at T.R. |
| Initial Slurry | 0-0-0 | | 400 gms. Insoluble Fraction in 2,000 ml. distilled H$_2$O. |
| Hydrolysis: | | | |
| After 4 days | 0.604-0.038-0.254 | 7.0:3:4.9 | pH of hydrolysis soln. =10.6. |
| After 8 days | 0.313-0.032-0.128 | 7.0:3:4.8 | pH of hydrolysis soln. =10.5. |
| After 11 days | 0.144-0.014-0.061 | 7.0:3:4.8 | pH of hydrolysis soln. =9.8. |
| After 18 days | 0.104-0.005-0.050 | 6.8:3:4.5 | pH of hydrolysis soln. =9.5. |
| After 25 days | 0.093-0.005-0.045 | 7.1:3:4.4 | pH of hydrolysis soln. =9.3. |
| After 32 days | 0.066- -0.033 | 5.8:3:4.5 | pH of hydrolysis soln. =9.3. | while those for the low sodium reaction products ($x=6$ to 14) and their soluble fractions are at approximately 5.38, 4.63, and 2.48 angstroms (B pattern). The lines of major significance are shown below in Table III, wherein A and B are patterns for the original reaction products before leaching.

TABLE III.—X-RAY POWDER PATTERNS OF REACTION PRODUCTS

| d-spacing A. | A Pattern (Na=14–15) Intensity [1] | B Pattern (Na=6–14) Intensity [1] |
|---|---|---|
| 8.4 | [1] 45 | [1] 40 |
| 7.7 | [2] 45 | [2] 40 |
| 6.4 | [2] 20 | [2] 20 |
| 5.38 | [1] 85 | [1] 80 |
| 4.94 | [2] 85 | [2] 80 |
| 4.63 | [1] 100 | [1] 100 |
| 3.94 | [2] 10 | [2] 10 |
| 3.81 | 0 | 1, [2] 10 |
| 3.61 | [2] 40 | 0 |
| 3.53 | 0 | [2] 10 |
| 3.35 | [1] 20 | [1] 30 |
| 3.16 | [2] 20 | [2] 40 |
| 2.91 | [1] 40 | [1] 40 |
| 2.73 | 0 | [2] 35 |
| 2.57 | 1, [2] 30 | 1, [2] 50 |
| 2.54 | [2] 40 | 0 |
| 2.48 | 1, [2] 50 | 1, [2] 70 |
| 2.20 | [2] 10 | 0 |
| 2.08 | [2] 10 | [2] 10 |
| 1.94 | [2] 20 | [2] 10 |
| 1.90 | [2] 20 | [2] 10 |

[1] Line intensity estimated on a scale ranging between 0 (for no observable lines) to 100 (for lines of highest intensity).
[1] Lines for $Na_2HPO_4 \cdot 2H_2O$.
[2] Lines for insoluble fraction.

In a preferred method of producing the reaction products of the invention, aluminum hydroxide is first reacted with concentrated phosphoric acid (e.g., 85% orthophosphoric acid) and then to this reaction mixture is added an aqueous, concentrated solution of sodium hydroxide. Normally, reaction will be accomplished under agitation and the reaction product will dry from the vigorous exothermic reaction without the addition of heat. If the sodium hydroxide solution is added rapidly (and this is preferred) steam will be quickly evolved and a fairly dry, particulate product will result normally within one or two minutes, and certainly within five minutes. In large-scale batch production, it is common for evolved steam to condense on cooler walls of the reaction vessel and flow back into the reaction mixture. Under such circumstances it will be necessary to thereafter remove such water in a drying step which may be accomplished in any conventional drying equipment such as a rotary dryer, kiln, kiln mill, etc. Drying temperatures up to about 150° C. are suitable without appreciable decomposition of the product.

The reaction between the aluminum compound and the phosphoric acid is not extremely vigorous and is only slightly exothermic; a temperature rise of 5–20° C. is normally observed. By comparison, the reaction between the sodium compound and phosphoric acid, or phosphoric acid-aluminum hydroxide reaction product, is extremely vigorous, with the rapid evolution of heat and steam. For this reason, it is preferable to first react the aluminum compound with the phosphoric acid (heating may be required to initiate the reaction) leaving the more vigorous reaction to be completed last and thereby utilizing heat of reaction to dry the final reaction product. As an alternative, the aluminum compound may be first added to the sodium hydroxide solution to form a mixture of sodium aluminate and sodium hydroxide which is thereafter added to the concentrated phosphoric acid. This latter procedure also produces a vigorous exothermic reaction.

The following specific examples illustrate the process of preparing the sodium aluminum phosphate reaction products disclosed herein, but should not be construed as limiting the broader aspects of the invention.

*Example 1*

To 461.0 grams of 85% $H_3PO_4$ were added 117.0 grams of hydrated alumina. This mixture was then heated at a temperature between 60 and 80° C. in a Hobart mixer bowl until the alumina had substantially reacted, after which time 260.0 grams of 55% sodium hydroxide solution was rapidly added. After a short induction period (20 to 30 seconds) a vigorous reaction was observed with the evolution of stem and rapid condensation of the reaction product to a fine particulate mass. When the reaction had subsided, about 60 to 100 seconds, a dry granular product was recovered. This product was further dried at 80° C. in an oven and then milled. Analysis revealed 47.5% $P_2O_5$, 12.8% $Al_2O_3$, and 18.2% $Na_2O$ with a loss on ignition of 21.5%. Upon X-ray analysis, a weak pattern corresponding to Pattern B of Table III (without disodium phosphate lines) was observed.

*Example 2*

The reaction product of Example 1 was leached under agitation in a 25% aqueous slurry at room temperature for one hour, then recovered (filtered), washed with water, and dried at 100° C. in an oven. The dried residue was analyzed and found to contain an Na:Al:P ratio of 3.7:3:5.3. The X-ray powder pattern of this residue was essentially the same as that of the reaction mixture of Example 1.

*Example 3*

Hydrated alumina was reacted with 85% $H_3PO_4$ in the same quantities and using the same procedure described in Example 1. Four hundred and eight grams of 55% sodium hydroxide solution were then added rapidly to the hydrated alumina-$H_3PO_4$ reaction product. The final reaction product was dried and milled in the manner shown in Example 1. Upon analysis, the reaction product was found to contain 25.6% $Na_2O$, 11.5% $Al_2O_3$, and 42.8% $P_2O_5$ with a loss on ignition of 20.1%. The X-ray pattern was essentially the same as that shown as Pattern B in Table III, supra.

*Example 4*

The reaction product of Example 3 was leached under agitation in a 25% aqueous slurry at room temperature for one hour, washed thoroughly with water, and dried at 100° C. The solid residue was analyzed and found to contain a Na:Al:P ratio of 6:3:5.2. An X-ray powder pattern of the solid residue indicated Pattern B material, excluding the lines for disodium orthophosphate.

*Example 5*

Using the procedure of Example 1, 461.0 grams of 85% $H_3PO_4$ were reacted with 117.0 grams of alumina and to the product was then added 555 grams of a 55% aqueous solution of sodium hydroxide. After reaction, the product was dried and milled. The analysis showed 31.0 $Na_2O$, 10.2% $Al_2O_3$, and 37.8% $P_2O_5$. Pattern A was found by X-ray. Lines for disodium orthophosphates were very sharp and pronounced.

*Example 6*

The reaction product of Example 5 was leached for one hour in water and the insoluble portion recovered and dried. The insoluble portion, by analysis, was found to contain a Na:Al:P ratio of 9.9:3:5.3, and have an X-ray powder pattern the same as Pattern A of Table III, but excluding the lines therein for disodium orthophosphate.

The new compositions of the invention, both reaction products and insoluble fractions thereof, have been found to be highly desirable emulsifying agents for process cheese. By definition, pasteurized process cheese is a food product prepared by comminuting and mixing, with the aid of heat, and the addition of a small amount of emulsifying agents, not exceeding 3% of the total weight of the finished product, one or more cheeses of the same or different varieties. Many cheese varieties, e.g., American Cheddar, Swiss, Brick, Limburger, etc., are today available in pasteurized process form. In the cooking and preparation of cooked cheese foods, process cheese has many advantages over natural cheese. It melts smoothly and quickly without fat separation or stringiness. Because it may be prepared as a blend of various types of cheese, balanced flavors and textures may be produced. But perhaps the most important characteristic of process cheese is its excellent keeping qualities. For although cheeses of all types have fairly long keeping quality, they are, nevertheless, perishable in varying degree. Some varieties, e.g., Parmesan, have a long life, while others, e.g., Camembert, are at their best for only a very short time. The natural ripening process which yields the distinctive cheese flavors and textures does not cease when the cheeses have reached their prime. Further loss by deterioration or drying out of the cheese has long been a problem to the cheese manufacturer.

Much like the milk from which it is produced, cheese is a complex food product. The final acidity of the cheese and the flavor are mainly influenced by the means used to prepare the cheese curd and the curing conditions of the final curd. The palpable qualities of a commercially desirable cheese include smooth texture, high resiliency, softness, moistness, pleasing flavor, and the like. Color, a feature of localized consumer preferences, is easily controlled by the addition of pure vegetable coloring matter to the milk.

It has been estimated that about 55% of the cheese produced in the United States is of the process type, and presumably a large portion of this is ultimately utilized in the preparation of cooked cheese dishes. Natural cheese is less suitable for cooking since the fat tends to separate from the casein when the cheese is subjected to heat. Fat separation is prevented in process cheese by the use of emulsifying agents, i.e., sodium phosphates and sodium citrate. All common sodium phosphates, with the possible exception of sodium tripolyphosphate and the cyclic metaphosphates (tri- and tetrameta-), may be utilized in cheeses and cheese foods. But the orthophosphates are almost exclusively used in process cheese in the United States. Pyrophosphates such as tetrasodium pyrophosphate, produce a somewhat bitter flavor in the final cheese, while sodium tripolyphosphate usually produces a non-melting cheese. The predominantly long chain phosphates, such as sodium hexametaphosphate, tend to produce a brittle non-melting cheese which may be improved somewhat by buffering to higher pH. But for one notable exception, mixtures of the various sodium phosphates may be freely used as the emulsifying ingredients in cheese. The exception is pyrophosphate-orthophosphate mixtures which somehow interact to produce a non-melting, rather undesirable cheese product.

Although disodium orthophosphate is highly satisfactory in preventing fat separation from cheeses, its use is limited by the possible formation of crystals (almost always $Na_2HPO_4 \cdot 12H_2O$) in the final cheese product. This limitation may be a problem if a disodium orthophosphate concentration of about 1.6% (finished cheese basis) is exceeded. Although citrates are themselves crystal formers (calcium citrate crystals), the two types of crystals apparently form independently of each other. For this reason, citrates may be used as auxiliary emulsifiers when 1.6% disodium phosphate will not completely emulsify the particular cheese variety. However, the use of citrate with disodium orthophosphate is also limited by certain interactions between the two anions.

It is clear that the emulsifying agents presently available are not entirely satisfactory for use in process cheese. In American process cheese, food regulations permit the use of emulsifiers up to a level of 3% by weight of the final cheese, but because of the limitations caused by the formation of crystals with the known phosphate emulsifiers, they cannot normally be used at levels above about 2% by weight. This is true in spite of a need to emulsify cheeses extremely degraded by bacterial action or having certain other poorly defined characteristics.

The compositions of the present invention have many advantages over the sodium phosphates and citrates used heretofore in emulsifying cheese products. The new compositions can provide different pH levels furnishing flexibility in changing the characteristics of the cheese. An immediate development of melt is produced when cheese is emulsified with the novel compositions, whereas, with disodium orthophosphate, a curing period of anywhere from 7 to 15 days is necessary before adequate melt will develop. Crystal formation is completely eliminated at the 3% maximum allowable limit when using the emulsifying or melting salts of the instant invention. Further, emulsification produced by the new compositions is actually superior to that of the known emulsifying agents since there is less tendency for leakage of fats during heating of a cheese containing the compositions that with an equivalent amount of disodium orthophosphate. The physical properties of the cheeses produced with the new compositions have been found to be equivalent to those furnished by disodium orthophosphate and in some cases markedly superior.

The following specific examples illustrate the properties of the novel compositions of the invention when incorporated in pasteurized process cheese.

*Example 7*

Three different reaction product compositions were first prepared by the methods illustrated in Examples 1 through 6, supra. These compositions were thereafter utilized in process cheese in their original form, that is, without leaching off the soluble fraction. The analyses of these three compositions are as follows:

Composition I—14.4% Na; 6.5% Al; 20.3% P; and 22.5% loss on ignition

Composition II—21.9% Na; 6.2% Al; 18.6% P; and 19.6% loss on ignition

Composition III—23.3% Na; 5.4% Al; 17.3% P; and 20.1% loss on ignition

A blend of natural Wisconsin cheddar cheeses was first formulated using 15% mild cheese, 70% medium cheese, and 15% aged cheese. The cheese was ground through a meat grinder with a ⅛ inch plate. Forty pounds of cheese were used for each test. One pound of each of the various phosphate emulsifying agents was added just before addition of the last of the cheese to the cooker. The cooker was a forty pound pilot plant unit with a screw for mixing and means for injection of steam. The screw was driven through an essentially closed cylinder and therefore the cheese could not easily recirculate or escape its action. Each chese batch was normally cooked for a period of between three to seven minutes (after phosphate addition) to 160° F. The cheese was then mixed one minute at 160° F., poured into five pound cheese cartons, and heat-sealed by inverting the box with liner. The final cheese was pre-cooled at room temperature and held overnight at 45° F. in a cooler. The samples were then sliced on a rotating circular blade type slicer, packaged in moisture-impermeable film, and stored for a period of one month under temperatures of 90° F., room temperature, 55° F., and 35° F. The resulting properties of the test cheeses are summarized in the following table.

TABLE IV.—EFFECT OF VARIOUS EMULSIFYING AGENTS ON BLENDED PROCESS CHEESE

| Emulsifying Agent(s) (2.5% of Final Cheese) | Cheese, pH | Melt, percent | Bloom (Hardness) Reading | | Break Characteristics | Crystals One Month |
|---|---|---|---|---|---|---|
| | | | Initial | Final (35° F.) | | |
| DSP | 5.57 | 21 | 336 | 328 | Straight | Moderate. |
| Composition I | 5.20 | 10 | 518 | 403 | Mod. jagged | None. |
| Composition I plus 20% TSP | 5.43 | 11 | 351 | 346 | V. sl. jagged | Do. |
| Composition I plus 40% STPP | 5.29 | 4 | 500+ | 500+ | Trace jagged | Do. |
| Composition I plus 20% SHMP | 5.09 | 7 | 500+ | 450 | Jagged | Do. |
| Composition II | 5.53 | 26 | 284 | 276 | Sl. jagged | Do. |
| Composition II plus 20% TSP | 5.72 | 8 | 224 | 248 | do | Do. |
| Composition II plus 20% SHMP | 5.32 | 1 | 500+ | 348 | Straight | Do. |
| Composition III | 5.72 | 18 | 257 | 267 | V. sl. jagged | Do. |
| Composition III plus 20% SHMP | 5.51 | 8 | 335 | 317 | Straight | Do. |
| DSP | 5.59 | 7 | 334 | 312 | Trace jagged | Slight. |

DSP=disodium orthophosphate. TSP=trisodium phosphate. STPP=sodium tripolyphosphate.
SHMP=sodium hexametaphosphate. Mod.=moderate. Sl.=slight. V. sl.=very slight.

In the above table, percent "Melt" was determined by cutting cores from the cheese test samples with a ⅞ inch (No. 15) cork borer, placing these cores in the bottom of stainless steel beakers, and inserting said beakers in boiling water for four minutes until the cores were melted. Diameters of the melted cores were measured and the percentage increase in core diameter recorded as the "Melt" percent shown in Table IV above. Break characteristics reported in the table were determined by bending slices of the cheese over double while the same were at room temperature. Hardness of the resulting cheese samples was determined by standard methods employing a Bloom Gelometer which employs a varying weight load to drive a small piston into a cheese sample of given dimensions. In the above table, the "Bloom" reading is the weight in grams required to drive a ½ inch diameter plunger 4 mm. into a given cheese sample. The Bloom readings were made the day following preparation of the cheese and fifteen days thereafter. In both instances the cheese test sample was held at room temperature.

Break characteristics and crystal formation reported in the above table were evaluated visually. As will be observed from the table, both control samples comprising disodium orthophosphate as the emulsifying agent exhibited crystal growth within one month after preparation. By comparison, all of the samples containing the novel compositions of the invention, either alone or together with other standard phosphate emulsifying agents, were crystal-free at the end of one month's storage. Only Composition III (the most alkaline of the three experimental compositions) would be rated as equal or superior to DSP in emulsification and effect upon cheese characteristics. All three compositions produced better melt characteristics than DSP, especially after aging at low temperatures. The use of other phosphates in combination with the three compositions, in general, altered the properties of the cheese in the predicted manner.

*Example 8*

The experiments of this example were performed to determine the comparative effects of certain reaction products, and insoluble fractions thereof, as emulsifying agents is mild and sharp cheeses. Also, it was desired to learn what portion the emulsifying activity of the compositions result from the soluble fraction and the insoluble fraction. The compositions tested had the following analyses:

Composition IV—13.8% Na; 7.1% Al; 21.2% P; and 20.8% loss on ignition

Composition IV (insoluble fraction)—8.0% Na; 16.9% Al; and 14.2% P

Composition V—19.3% Na; 6.0% Al; 16.4% P; and 25.5% loss on ignition

Composition V (insoluble fraction)—16.6% Na; 11.2% Al; and 17.7% P

Mild and sharp Cheddar cheese, approximately one month and one year old, respectively, were selected for the present experiments. The mild cheese had a water content of 36.5% and a fat content (dry weight basis) of 51.9%, while the sharp cheese had a water content of 38.7% and a fat content of 50.6%. For each batch of process cheese, 300 grams of Cheddar was first cut into fine pieces and placed in a Mirro aluminum double boiler. The double boiler was then partly immersed in boiling water. Seven and a half grams of the candidate phosphate emulsifying agent was slurried in water and added to the cheese. The cheese was further heated in boiling water and steamed to a temperature of about 140° F. The propeller of a Model L Lightnin mixer was then lowered into the double boiler and mixing started. The cheese was thereafter heated with stirring to 161–164° F. and, finally, poured into three 150 ml. metal beakers. After cooling at room temperature, the cheese pH was determined. The cheese samples were then stored in a refrigerator overnight, after which a portion of each sample was layered with paraffin and held in the refrigerator for fifteen days' evaluation. Each batch of cheese so prepared was evaluated at one and fifteen days for meltability, slicing characteristics, break, and resiliency as described supra. The results of these tests are presented in Table V. The following abbreviations used hereinafter have the indicated meaning:

tr.=trace
sl.=slight
mod.=moderate
v.=very sprd.=spread
sep.=separation
res.=resilient TABLE V.—RELATIVE EFFECT OF SOLUBLE AND INSOLUBLE FRACTIONS ON EMULSIFICATION [i]

|  | Composition IV | | Composition IV Insoluble Fraction | |
|---|---|---|---|---|
|  | Mild Cheese | Sharp Cheese | Mild Cheese | Sharp Cheese |
| Percent Melt, 1 day | 16.5 | 79.5 | 77.3 | 104.0. |
| Percent Melt, 15 days | 6.3 | 34.8 | 66.3 | 81.2. |
| Melt Characteristics, 15 days. | V. sl. spread, fat sep | Sl. sprd., grainy, pronounced fat separation. | Uniform, no fat separation | Uniform, sl. fat separation. |
| Sliceability, 15 days | Mod. smooth | V. rough | Smooth | Sl. rough. |
| Break, 15 days | V. jagged | Jagged | None, tears straight | Sl. jagged. |
| Resiliency, 15 days | V. sl. res | None, poorly knit | Resilient | Sl. res. |
| Cheese, pH | 5.02 | 5.39 | 5.19 | 5.38. |
| Emulsion characteristics | No fat sep., v. pourable | No fat sep., v. pourable, mealy. | No fat sep., v. pourable, stringy after cooling. | No fat sep., v. pourable, sl. stringy when cool. |

|  | Composition V | | Composition V Insoluble Fraction | |
|---|---|---|---|---|
|  | Mild Cheese | Sharp Cheese | Mild Cheese | Sharp Cheese |
| Percent Melt, 1 day | 65.4 | 132.0 | 59.0 | 77.3. |
| Percent Melt, 15 days | 65.4 | 98.1 | 53.5 | 77.3. |
| Melt Characteristics, 15 days. | Uniform, no fat separation | Uniform, v. sl. grainy tr. fat separation. | Uniform, no fat separation | Uniform, sl. fat separation. |
| Sliceability, 15 days | Mod. smooth | Mod. rough | Mod. smooth | Rough. |
| Break, 15 days | None, tears straight | Jagged | None, tears straight | Jagged. |
| Resiliency, 15 days | Resilient | Trace res. soft | Resilient | Sl. res. |
| Cheese, pH | 5.49 | 5.59 | 5.48 | 5.79. |
| Emulsion characteristics | Fat out and in, pourable | No fat sep., v. pourable | No fat sep., pourable, stringy when cool. | No fat, v. pourable, sl. stringy. |

[i] Cheese pH's without phosphate: Mild 5.23, Sharp 5.56.

The data of Table V indicate that both the reaction products and the insoluble fractions thereof are useful for preventing gross separation of fat in melted cheese. Not only do the compositions retain their ability to emulsify cheese when the soluble fraction is removed, but in one instance, with Composition IV, the insoluble fraction may be observed to be superior to the original reaction product in its effect on melt. Although not shown in the table, none of the cheeses reported formed crystals at the 2.5% level used for the tests.

*Example 9*

Using the procedure described in Example 8, test samples of process cheese containing various levels of emulsifier and mixtures of emulsifiers, were prepared. The insoluble fraction of Composition III, having an analysis of 23.9% Na, 9.1% Al, and 19.6% P, was used. The emulsion characteristics observed during preparation of the cheese were observed. The following table shows the results of these experiments.

TABLE VI.—EFFECTS OF ALKALINE INSOLUBLE FRACTIONS ON THE CHARACTERISTICS OF PROCESS CHEESE

| Emulsifying Agent | Cheese pH | Emulsion Characteristics | Melt, percent | | Break | Oiling off [i] | Bloom | | Resil.[ii] | Crystal Formation |
|---|---|---|---|---|---|---|---|---|---|---|
|  |  |  | Init. | 15 Day |  |  | Init. | 15 Day |  |  |
| 1. None | 5.38 | No fat out, v. stiff, v. pourable. | 92 | 89 | None, jagged tear. | Pronounced | 190 | 190 | Trace | None. |
| 2. 3.0% DSP | 6.26 | Fat out and not quite all in, sl. stiff, mod. pourable. | 63 | 60 | Sl. jagged | Mod | 285 | 260 | V. sl | Mod. |
| 3. 3.0% Comp. III, Insolubles. | 6.09 | Trace fat out and in, v. stiff, mod. pourable, sl. stringy. | 31 | 29 | Mod. jagged | V. sl | 345 | 330 | Sl | None. |
| 4. 2.5% DSP | 6.19 | Mod. fat out and not all in, v. pourable. | 6 | 46 | Straight | Sl | 330 | 240 | V. sl | V. sl. |
| 5. 2.5% Comp. III, Insolubles. | 5.99 | Sl. fat out and in | 51 | 51 | Sl. jagged | Mod | 275 | 285 | Sl | None. |
| 6. 2.0% DSP | 5.91 | Trace fat out and not quite all in, v. pourable. | 6 | 50 | Straight | Mod. sl | 285 | 260 | V. sl | Trace. |
| 7. 2.0% Comp. III, Insolubles. | 5.89 | Fat not out, v. stiff, rubbery, stringy, sl. pourable. | 10 | 10 | Sl. jagged | Trace | 365 | 385 | Mod | None. |
| 8. 1.6% Comp. III, Insolubles 0.4% SHMP. | 5.69 | Fat out, v. sl., and in, stiff pourable. | 48 | 59 | None, straight tear. | V. sl | 235 | 235 | Mod | None. |

[i] = Oiling off is a qualitative measurement of fat separation.
[ii] = Resiliency is a measure of the deformability of cheese.

Example 10

Process cheese samples were prepared in accordance with the procedure described in Example 8 and the level of emulsifying agent was varied between 2% and 6% by weight of the final cheese composition. The purpose of these experiments was to determine the optimum concentrations of emulsifier before crystal formation occurs. The results of these experiments are shown in the following table.

TABLE VII.—EFFECT OF EMULSIFYING AGENT CONCENTRATION ON PROCESS CHEESE

COMPOSITION III

| Emulsifying Agent | Cheese pH | Melt, percent | | Hardness | | Fat Leakage | | Crystals |
|---|---|---|---|---|---|---|---|---|
| | | Init. | 15 Days | Init. | 15 Days | In Melt | On Paper | |
| 2% DSP | 5.8 | 9 | 33 | 295 | 240 | None | Trace | Trace. |
| 3% DSP | 6.2 | 25 | 64 | 190 | 205 | ...do | V. Sl | Mod. |
| 2% Composition III | 5.7 | 42 | 65 | 155 | 145 | ...do | V. Sl | 0. |
| 3% Composition III | 5.9 | 30 | 53 | 155 | 135 | ...do | V. Sl | 0. |
| 4% Composition III | 6.2 | 25 | 32 | 200 | 170 | ...do | V. Sl | 0. |
| 5% Composition III | 6.4 | 10 | 15 | 210 | 225 | ...do | Trace | Trace. |
| 6% Composition III | 6.6 | 4 | 2 | 500 | 395 | ...do | ...do | Sl. |

COMPOSITION II

| 2% DSP | 5.8 | 10 | 77 | 195 | 195 | None | V. Sl | Trace. |
| 3% DSP | 6.2 | 28 | 55 | 195 | 230 | Trace | V. Sl | Mod. |
| 2% Composition II | 5.4 | 38 | 82 | 140 | 210 | None | Sl | 0. |
| 3% Composition II | 5.5 | 30 | 51 | 135 | 215 | ...do | Sl | 0. |
| 4% Composition II | 5.7 | 20 | 58 | 150 | 195 | ...do | Sl | 0. |
| 5% Composition II | 5.8 | 28 | 31 | 165 | 210 | ...do | Sl | 0. |
| 6% Composition II | 5.9 | 4 | 6 | 290 | 230 | ...do | Trace | Trace. |

It may be observed from the data of Table VII that the compositions may be used as emulsifying agents at concentrations up to 5 or 6% without the formation of crystals. In special cases, the compositions may be added at concentrations even higher than 6% since these higher concentrations would present no greater a crystal problem than chesse products currently sold commercially. Although the concentration of the emulsifying agent is largely responsible for the formation of crystals, the quality of the cheese used can be a very important factor in the ultimate formation of crystals. Thus, cheese containing 6, 7, and even 8% of the emulsifying compositions of the invention have been found to be free of crystals when the natural cheese was of an inherently high quality. On the other hand, crystals have been found to form in low quality cheeses at composition levels even below 5 or 6%.

When the compositions of the invention, or insoluble fractions thereof, are used as the sole melting salts in process cheese, the preferred concentration is between about 0.5% and 3.0% by weight of the final cheese product. Nevertheless, lower concentrations, down to about 0.01% by weight of the final cheese, may be effectively utilized in combination with the known phosphate melting salts or the known crystalline or amorphous sodium aluminum phosphates. For instance, in superior grades of cheese (e.g., those not affected by a crystal growth problem) a melting salt mixture consisting of a large proportion of disodium orthophosphate and a relatively minor amount of sodium aluminum phosphate may sometimes be advantageously used to produce optimum melting characteristics. Since each of the phosphate melting or emulsifying salts (including the sodium aluminum phosphates described herein) has its own individual effect upon the properties of cheese, combinations may be advantageously used to "tailor" the cheese to the most desirable qualities commensurate with the prospective use and consumer preferences. Likewise, characteristics other than crystal formation may provide important considerations when selecting the desired mixture of melting salts.

Reaction products having high sodium content (see Pattern A of Table III), and the leached insoluble fractions thereof, have been found to be quickly converted to the low sodium material (see Pattern B of Table III) when contained in process cheese. As stated hereinbefore, the conversion or transformation from one crystalline form to another is thought to be due to hydrolysis at Na—O—Al= linkages to form H—O—Al= linkages. The insoluble residue remaining in cheese to which has been added any of the novel sodium aluminum phosphate reaction products (or insoluble fractions thereof) will invariably exhibit that portion of the B X-ray pattern of Table III which is due to insolubles. More specifically, the insolubles remaining in process cheese to which has been added the novel reaction products (or insoluble fractions thereof, when isolated from such cheese, will exhibit an X-ray pattern with principal diffraction lines at approximately 4.94, 3.16, 2.57, and 2.48 angstroms. Minor, or less intense lines can also be observed at approximately 7.7, 6.4, 3.94, 3.81, 3.53, 2.73, 2.08, 1.94, and 1.90 angstroms. However, when a relatively impure sample of the salt is X-rayed and/or the X-ray pattern is not sharp, some of the lines of lesser intensity may be difficult to identify. Usually the minor lines at 3.53 and 7.7 angstroms can be observed. The principal line at 3.16 angstroms may be observed on a sharp pattern as a "doublet" with maximum intensity at 3.18 and 3.14 angstroms.

Characterization of the insoluble fraction having the A pattern (before addition to cheese) may be made from X-ray diffraction lines at approximately 4.94, 3.61, 3.16, 2.57, 2.54, and 2.48 angstroms. Although not necessary for characterization, the remaining lines at 7.7, 6.4, 3.94, 2.20, 2.08, 1.94, and 1.90 angstroms may also be observed on a sharp pattern made from a relatively pure sample.

Example 11

In accordance with the method described in Example 1, supra, one "high sodium" reaction product composition and one "low sodium" reaction product composition were prepared. These compositions had the following analyses:

Composition VI (high sodium)—25.2% Na; 6.0% Al; 18.8% P; and 9.5% loss on ignition Composition VII (low sodium)—18.1% Na; 5.7% Al; 17.6% P; and 20.7% loss on ignition Composition VI was X-rayed and found to have a pattern identical to Pattern A, while Composition VII was found to have a pattern identical to Pattern B. Test samples of process American cheese were prepared in accordance with the procedure described in Example 8, supra. To one of these test samples was added 3% by weight of Composition VI and to another sample was added the same amount of Composition VII. After being melted and cast in the form of discs, the emulsified cheese was placed in a refrigerator and stored for a period of one to two weeks. Each sample of cheese was then dissolved in 10% sodium citrate solution and centrifuged. The supernatant liquid was poured off and the solid residues dried at 120° C. The residues were X-rayed and found to exhibit identical patterns. These patterns exhibited principal diffraction lines at 4.94, 3.16, 2.57, and 2.48 angstroms corresponding to the lines of major intensity of the B pattern of Table III.

In a broader aspect, the present invention relates to the emulsification of process cheese with any of the heretofore known acidic crystalline or amorphous forms of sodium aluminum phosphate, as well as the novel reaction products, and insoluble fractions thereof, of the invention. Among the known sodium aluminum phosphates which may be used for emulsification are the acidic compounds of the general formula:

$$M_xAl_yH_z(PO_4)_{7-10} \cdot O\text{—}8H_2O$$

where M is an alkali metal selected from the group consisting of sodium, potassium, and mixtures thereof, and $x$, $y$ and $z$ are numbers of from 1 to 5, 2 to 4, and 11 to 17, respectively, with the sum of $x+3y+z$ numerically equal to the sum of the valences of the phosphate ($PO_4^=$) radicals, i.e., between 21 and 30. Also, M will comprise at least one gram atom of sodium. Non-hygroscopic potassium-modified forms of sodium aluminum phosphate where M in the above formula is both sodium and potassium, are disclosed in copending Blanch application, U.S. Serial No. 148,332, filed October 30, 1961 and now abandoned. One particularly preferred form found suitable for the present invention is the crystalline compound of the formula $NaAl_3H_{14}(PO_4)_8 \cdot 4H_2O$ disclosed in the U.S. Patent 2,550,490, and its stabilized form disclosed in the aforesaid Blanch application. Nevertheless, the other acidic SAP modifications may also be used. In this regard, the compounds of the formulas $$Na_4Al_2H_{14}(PO_4)_8 \cdot H_2O$$

(disclosed in copending Vanstrom application, Serial No. 172,852, filed February 13, 1962);

$$Na_3Al_2H_{15}(PO_4)_8 \cdot 2H_2O$$

(disclosed in copending Vanstrom application, Serial No. 173,054, filed February 13, 1962); and $$Na_3Al_3H_{12}(PO_4)_8 \cdot 5H_2O$$

(disclosed in copending Vanstrom application, Serial No. 172,865, filed February 13, 1962 and now abandoned) have been found suitable for inclusion in process cheese. Further, the dehydrated forms of SAP, e.g., $$NaAl_3H_{14}(PO_4)_8 \cdot 0\text{-}1H_2O$$

(disclosed in U.S. Patent 2,957,750); the amorphous compound of the general formula $$NaAl_3H_{11}(PO_4)_7 \cdot 5\text{-}8H_2O$$

(U.S. Patent 2,995,421) and various other species of sodium acid orthophosphates have utility, at least to some degree, in the emulsification of process cheese. Consequently, as used hereinafter and in the appended claims, the term "sodium aluminum phosphate" or simply "SAP" is intended to include all of the novel reaction product compositions of the invention, their insoluble fractions and the known acidic modifications represented by any of the above formulas. The above-mentioned U.S. patents and patent applications are hereby incorporated herein by reference.

In their usual application, the more acidic sodium aluminum phosphates (e.g., $NaAl_3H_{14}(PO_4)_8 \cdot 4H_2O$ has a pH of about 2.5 to 3.0 in a 1% slurry) are first either neutralized with a base or physically admixed with an edible inorganic base before inclusion in process cheese. For example, the compound of the formula $$Na_3Al_2H_{15}(PO_4)_8 \cdot 2H_2O$$

may be admixed with a stoichiometric amount of sodium carbonate (sufficient to completely neutralize the phosphate) and thereafter added directly as a dry mix to emulsify cheese. Such a dry mix will effect emulsification and yield a process cheese of acceptable quality. With most of the acidic sodium aluminum phosphates, however, a dry mix with an inorganic base will furnish poor emulsification. Consequently, it is normally preferable to neutralize, or partially neutralize, the acidic sodium aluminum phosphate before addition. This may be accomplished by reacting the sodium aluminum phosphate in an aqueous slurry containing sodium carbonate, sodium hydroxide, or the like. The prior art crystalline and amorphous sodium aluminum phosphates are generally too acidic to be added directly to cheese as the sole emulsifying agent. But they may be combined with more basic substances, e.g., the known sodium phosphate or citrate melting salts and/or the novel compositions (and insoluble fractions) of the present invention to produce cheese emulsifying mixtures of high effectiveness.

*Example 12*

To 20.0 grams of $NaAl_3H_{14}(PO_4)_8 \cdot 4H_2O$ in water was added 21.0 grams of granular bicarbonate of soda while stirring. A reaction was observed with the formation of a white precipitate. After the evolution of $CO_2$ ceased, the white precipitate was filtered off, washed with water and dried. Twenty-five grams of sharp aged Cheddar cheese was placed in a 250 ml. beaker and melted in a steam bath. When the temperature of the cheese reached 70° C., 0.5 grams of the aforementioned precipitate was added with stirring until the temperature reached 72° C. The cheese was then allowed to cool at room temperature. A control sample of the same cheese was prepared containing 0.5 grams disodium orthophosphate, dihydrate. Neither the control sample nor the sample containing the precipitate were observed to contain any crystals. The sample containing the precipitate was found to spread more upon melting. No fat separation was observed when either of the samples were melted.

*Example 13*

To 11 ml. of $H_2O$ was added 4.9 grams of $$NaAl_3H_{14}(PO_4)_8 \cdot 4H_2O$$

and 3.8 grams of sodium carbonate. After the evolution of $CO_2$ subsided, the reaction mixture was added to 200 grams of melted cheese. The cheese was cooled at room temperature. Upon evaluation, the cheese was found to have an initial melt of 19.0% and a "Bloom" of 211 grams. Visually, the cheese was found to melt uniformly with only a trace of fat loss.

While primarily useful with Cheddar cheeses (the process form widely known as "American") the novel compositions and known sodium aluminum phosphates may serve as the emulsifying agents in any of the many process cheeses, whether said cheeses are prepared from one or more natural cheeses of the same variety or of different varities. Among the suitable process cheeses are the regular process cheeses such as American Cheddar, Swiss, Brick, Limburger, Camembert, Gouda, Edam, Gruyere, Muenster, and Blue Cheese; the cheese foods (which mainly differ from regular process cheese by the fat, water, phosphorous and calcium content); and the cheese spreads (e.g., Velveeta). The so-called imitation cheese spreads which usually contain certain vegetable gums and higher water and/or lower fat content than regular process cheese may also utilize the sodium aluminum phosphates. The amount of sodium aluminum phosphate added to the cheese is not critical. Where not prohibited by food regulations, the sodium aluminum phosphates may be used at any level up to at least 10% by weight of the final cheese, but preferably at levels between about 0.5% and 5.0%. When used in combination with other melting salts, the sodium aluminum phosphates may comprise as little as 0.001% by weight of the final cheese.

In addition to their utility as melting salts, the novel sodium aluminum phosphate reaction products, and their insoluble fractions, have utility as additives to various food products. For example, they may be added to angel food cakes mixes to improve the grain and tolerance thereof. In such use, the reaction product normally comprises between about 0.5% to as much as 2.0% by weight of the cake mix. The known crystalline and amorphous sodium aluminum phosphates, while useful as leavening acids, do not have the same effect upon tolerance and grain.

As used herein and in the appended claims, the term "emulsifying agent" or simply "emulsifier" is to be construed as synonymous with the term "melting salt."

The foregoing detailed description has been given for clearness of understanding only and no unnecessary limitations should be understood therefrom as modifications will be obvious to those skilled in the art.

What is claimed is:

1. An edible pasteurized process cheese composition comprising the homogeneous reaction mixture of cheese and an emulsifying proportion of a sodium aluminum phosphate cheese emulsifying agent.

2. An edible pasteurized process cheese composition comprising the homogeneous reaction mixture of cheese and an emulsifying proportion of a physical mixture of cheese emulsifying agents consisting of at least one sodium aluminum phosphate cheese emulsifying agent and at least one cheese emulsifying agent selected from the group consisting of the alkali metal orthophosphates, the alkali metal polyphosphates, and the alkali metal citrates.

3. An edible pasteurized process cheese composition comprising cheese to which has been added an emulsifying proportion up to about 6% by weight of said composition of at least one emulsifying agent of the empirical formula:

$$x\text{Na}_2\text{O} \cdot y\text{Al}_2\text{O}_3 \cdot 8\text{P}_2\text{O}_5 \cdot z\text{H}_2\text{O}$$

where $x$ is a number from 6 to 14, $y$ is a number from 1.5 to 4.5, and $z$ is a number from 4 to 40, said emulsifying agent consisting of a water soluble fraction and a crystalline, water-insoluble, hydrolyzable fraction which will exhibit principal X-ray powder diffraction lines at approximately 4.94, 3.16, 2.57, and 2.48 angstroms.

4. An edible pasteurized process cheese composition comprising cheese to which has been added an emulsifying proportion up to about 6% by weight of said composition of at least one emulsifying agent of the empirical formula:

$$x\text{Na}_2\text{O} \cdot y\text{Al}_2\text{O}_3 \cdot 8\text{P}_2\text{O}_5 \cdot z\text{H}_2\text{O}$$

where $x$ is a number from 14 to 15, $y$ is a number from 1.5 to 4.5 and $z$ is a number from 4 to 40, said emulsifying agent consisting of a water soluble fraction and a crystalline, water-insoluble, hydrolyzable fraction which will exhibit principal X-ray powder diffraction lines at approximately 4.94, 3.61, 3.16, 2.57, 2.54, and 2.48 angstroms.

5. An edible pasteurized process cheese composition comprising the homogeneous reaction mixture of cheese and an emulsifying proportion up to about 3% by weight of said composition of at least one emulsifying agent of the empirical formula:

$$x\text{Na}_2\text{O} \cdot y\text{Al}_2\text{O}_3 \cdot 8\text{P}_2\text{O}_5 \cdot z\text{H}_2\text{O}$$

where $x$ is a number from 6 to 14, $y$ is a number from 1.5 4.5 and $z$ is a number from 4 to 40, said emulsifying agent yielding, in said pasteurized process cheese composition, an insoluble crystalline residue which will exhibit principal X-ray powder diffraction lines at approximately 4.94, 3.16, 2.57, and 2.48 angstroms.

6. An edible pasteurized process cheese composition comprising the homogeneous reaction mixture of cheese and an emulsifying proportion of a physical mixture consisting of at least one compound of the formula:

$$M_xAl_yH_z(PO_4)_{7-10} \cdot O\text{—}8H_2O$$

where M is an alkali metal selected from the group consisting of sodium, potassium and mixtures thereof, and $x$, $y$, and $z$ are numbers of from 1 to 5, 2 to 4, and 11 to 17, respectively, and an edible inorganic base.

7. An edible pasteurized process cheese composition comprising the homogeneous reaction mixture of cheese and an emulsifying proportion of an emulsifying reaction mixture produced by neutralizing a compound of the formula:

$$M_xAl_yH_z(PO_4)_{7-10} \cdot O\text{—}8H_2O$$

where M is an alkali metal selected from the group consisting of sodium, potassium and mixtures thereof, and $x$, $y$, and $z$ are numbers of from 1 to 5, 2 to 4, and 11 to 17, respectively, with at least a stoichiometrically equivalent amount of a compound selected from the group consisting of sodium carbonate and sodium hydroxide.

8. A method of producing pasteurized process cheese which comprises adding to comminuted natural cheese with the aid of heat and mixing, an emulsifying proportion of a sodium aluminum phosphate cheese emulsifying agent.

9. The edible pasteurized process cheese composition of claim 3 wherein the added emulsifying agent comprises not more than 3% by weight of said composition.

10. The edible pasteurized process cheese composition of claim 4 wherein the added emulsifying agent comprises not more than 3% by weight of said composition.

11. An edible pasteurized process cheese composition comprising cheese to which has been added an emulsifying proportion up to about 3% by weight of said composition of at least one emulsifying agent of the empirical formula:

$$a\text{Na}_2\text{O} \cdot 3\text{Al}_2\text{O}_3 \cdot b\text{P}_2\text{O}_5 \cdot c\text{H}_2\text{O}$$

wherein $a$ is a number between 2 and 11, $b$ is a number between 2.5 and 7.5, and $c$ is a number between 4 and 30, said emulsifying agent consisting of a crystalline, water-insoluble, hydrolyzable solid.

References Cited by the Examiner

UNITED STATES PATENTS

| | | | |
|---|---|---|---|
| 252,029 | 1/1882 | Gibbons et al. | 71—46 |
| 2,081,273 | 5/1937 | Guttenberg et al. | 99—117 |
| 2,251,496 | 8/1941 | Parsons | 99—116 |
| 2,564,374 | 8/1951 | Roland | 99—116 |
| 2,909,451 | 10/1959 | Lawler et al. | 117—169 |

A. LOUIS MONACELL, *Primary Examiner.*

D. M. STEPHENS, *Assistant Examiner.*